…

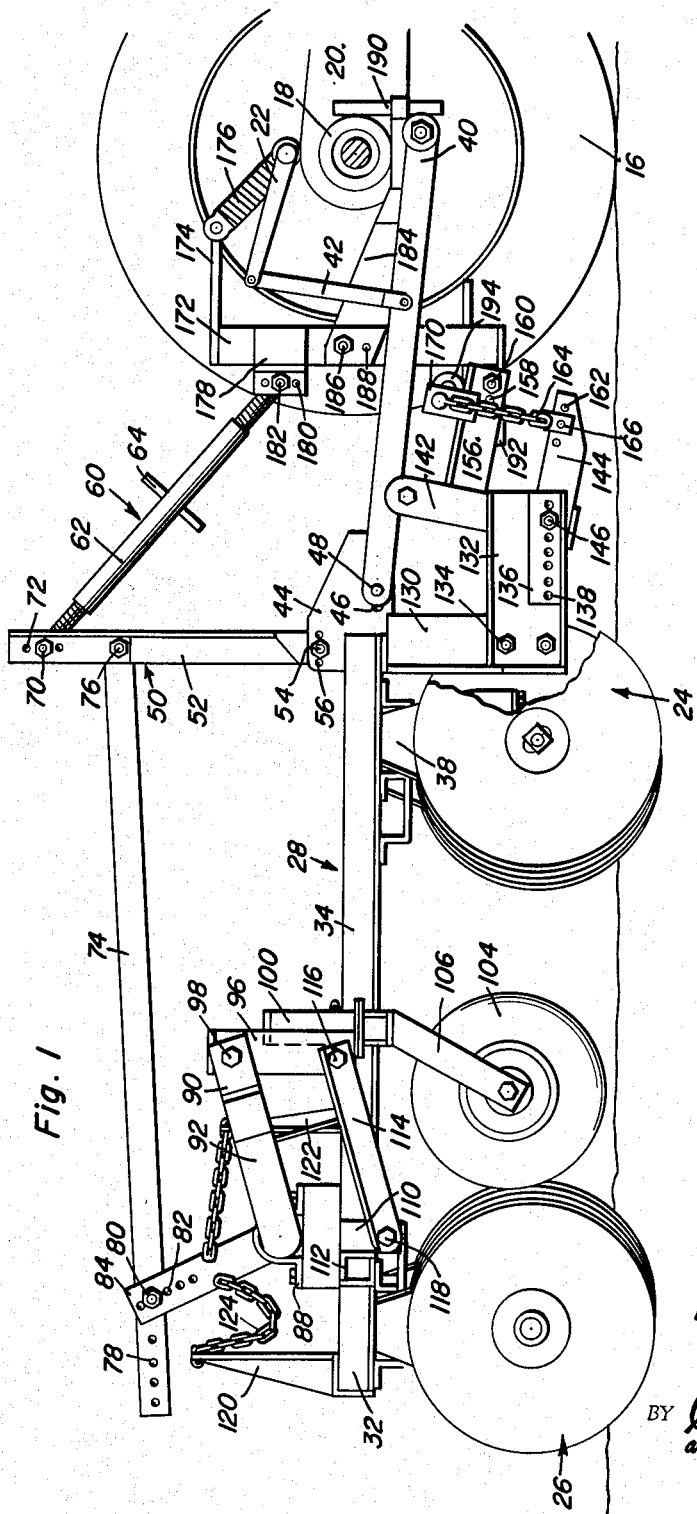

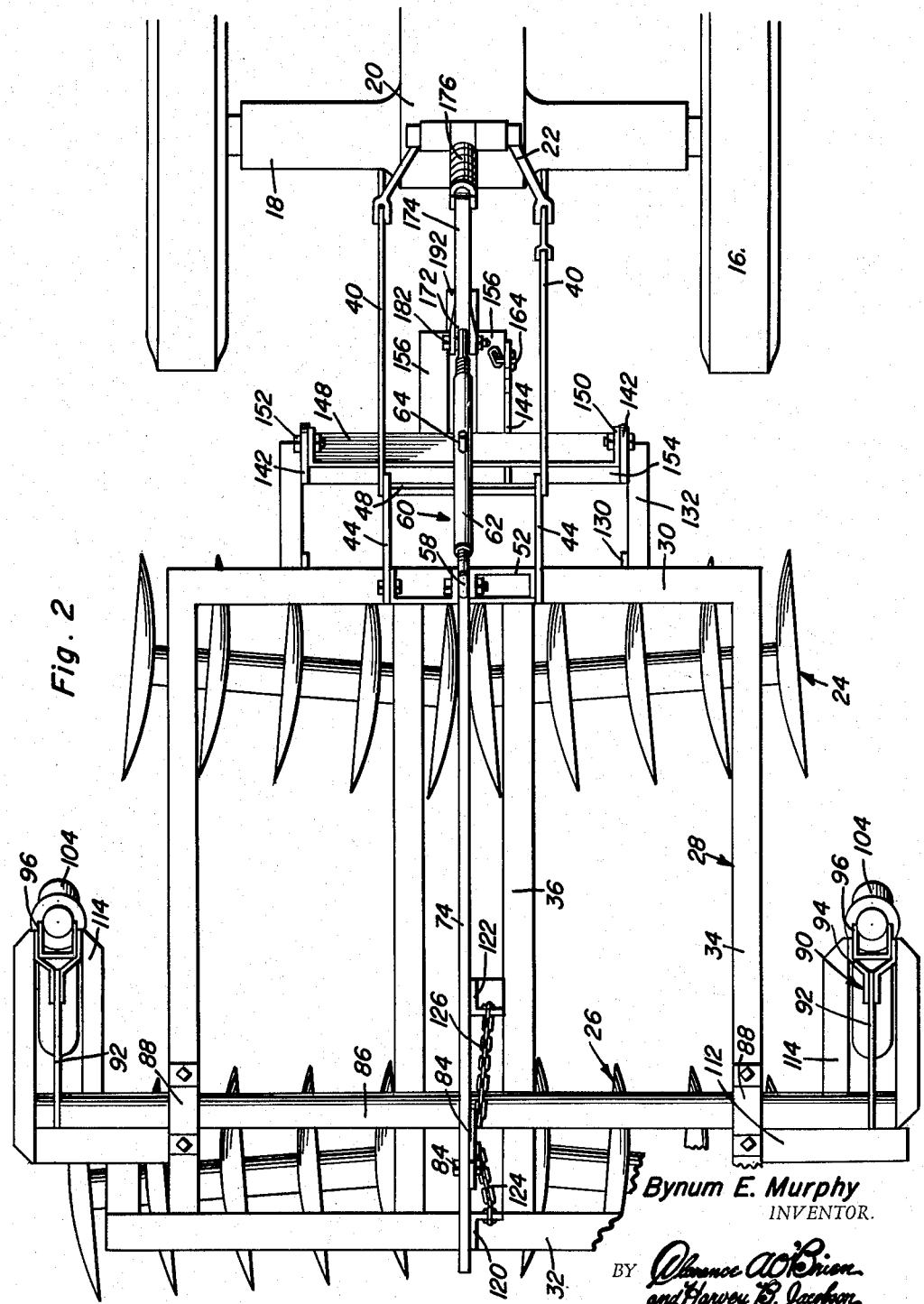

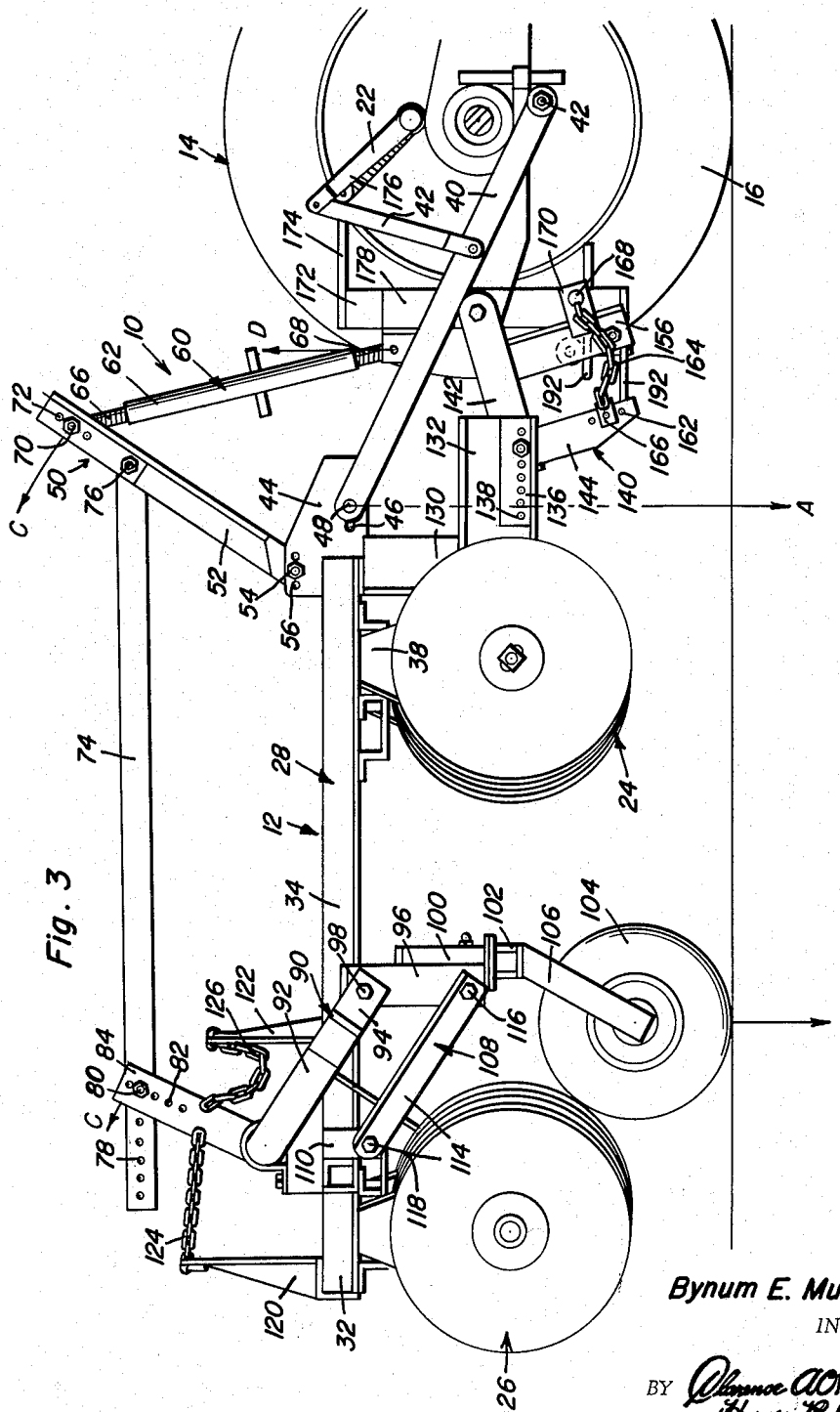

United States Patent Office 3,182,730
Patented May 11, 1965

3,182,730
LOAD CONTROLLING HITCH ASSEMBLY FOR HYDRAULIC DEPTH-CONTROLLED, TRAILING IMPLEMENTS
Bynum E. Murphy, Minden, La., assignor to Anderson-Dunham, Inc., doing business as Dunham Manufacturing Company, Minden, La., a corporation of Louisiana
Filed Oct. 15, 1963, Ser. No. 316,307
7 Claims. (Cl. 172—7)

The present invention generally relates to a hitch assembly for connecting a trailing implement to a towing tractor and includes features which enable the conversion of the pull exerted by the towing tractor onto the implement to downward thrust on the tractor for increasing the traction of the rear wheels of the tractor. In addition, the present invention incorporates a linkage and transport system which renders it possible for a towing tractor to raise an implement to an elevated position and transport the implement in such position when the implement is much heavier than is possible with a conventional three-point hitch system which is accomplished by the addition of an automatic control of auxiliary supporting wheels carried by the implement in spaced relation to the tractor.

An object of the present invention is to provide a hitch assembly including a linkage and transport system whereby a conventional hydraulically controlled three-point hitch system provided on a tractor may be connected or employed with implements that heretofore have been impossible for the tractor to carry even though the hydraulic system could raise the load of the implement. This is accomplished while allowing the front end of the tractor to remain on the ground when transporting the implement thereby eliminating the necessity of adding weights to the front end of the tractor to hold it down. In carrying out this object, the linkage and transport system incorporates auxiliary wheels carried by the implement in spaced relation to the tractor together with linkage mechanism for lowering and raising the auxiliary wheels in relation to the implement for supporting a portion of the weight of the implement from the auxiliary wheels when the hydraulic system of the tractor is operated to effect elevation of the front end of the implement where it is attached to the conventional three-point hitch.

Another object of the present invention is to provide a linkage and transport system in accordance with the preceding object in which the structure is relatively simple, dependable, long lasting and relatively inexpensive to manufacture and install.

Another important object of the present invention is to provide a hitch assembly including a traction increasing feature in which the pull of the tractor exerted against the implement is converted to a downward thrust on the tractor for increasing the effective weight on the rear driving wheels which, in turn, increases the traction on the tractor rear tires or wheels. This added weight enables the tractor to pull a heavier load with less wheel slippage or spinning and also eliminates the necessity of having to attach additional weights for more traction and later on remove such weights when a different implement is attached.

A still further object of the present invention is to provide a traction hitch assembly in which the pull or draft of the tractor serves to actuate the conventional automatic depth-control valve in the hydraulic system of the tractor which normally is dependent upon the forward roll of the implement to set up a thrust force on the top links of the hitch system. Conventionally, the top link, that is, the link that connects the top of the A-frame of the implement to the tractor, must have a thrust force imparted thereto in order to operate the automatic depth-control valve. This thrust is provided by forward roll of the implement due to the earth engaging element of the implement tending to stand still while the remainder of the implement tends to move forward thus causing a rolling action of the implement for imparting a thrust force to the top link. Thus, with the present invention which does not depend upon the forward roll of the implement to set up a thrust force on the top link, it is as easy for the tractor to apply the necessary thrust on the automatic depth-control system when using a broad based implement such as a tandem disk harrow, as when using a narrow based implement, such as a breaking plow or the like inasmuch as the tractor does not have to use as great a percentage of its built-in weight and traction before the implement begins to roll over. In actuality, the hitch of the present invention actually builds up the weight of the tractor in two ways. The first way is by converting the pull of the tractor into a downward thrust on the tractor and also by the conventional lifting action of the automatic depth control or draft control system built into the tractor which is, of course, a conventional arrangement.

Still another important feature of the present hitch assembly is that it lowers the draft point on the tractor and sets up a greater thrust force on the automatic depth control hydraulic system which is usually above the longitudinal center line of the tractor and this feature helps to hold the front of the tractor down and thus gives more weight on the front wheels which in turn gives better steering control of the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the hitch assembly illustrating the orientation of the hitch assembly and the tractor and implement with the implement being in working position;

FIGURE 2 is a top plan view of the construction of FIGURE 1 with portions thereof broken away;

FIGURE 3 is a side elevational view of the assembly of the present invention illustrating the transport mechanism in operative position with the implement elevated to a transporting position.

Referring now specifically to the drawings, the hitch assembly 10 is employed for connecting a towed implement to a conventional tractor 14 having rear driving wheels 16, a transverse axle housing 18, a differential housing 20 in the center of the axle housing 18 and hydraulically controlled lift arms 22 swingable in a vertical plane by a hydraulic control mechanism conventionally provided on the tractor. Inasmuch as the hydraulically operated lift arms 22 are well-known in this field of endeavor, no detailed disclosure thereof is deemed necessary.

The implement 12 is in the form of a broad based implement such as a disk harrow having a forward disk gang assembly 24 and a rear disk gang assembly 26 with it being pointed out that any number of disk gangs may be employed. The implement 12 includes a generally horizontally disposed supporting frame 28 to which the disk gangs 24 and 26 are attached. The supporting frame 28 is provided with a transverse front member 30 and a transverse rear member 32 and longitudinally extending side members 34 and a pair of longitudinally extending central frame members 36 all as illustrated in FIGURE 2. The disk gangs 24 and 26 are attached to the frame 28 in any suitable manner such as by depending brackets 38.

The hitch assembly 10 includes the usual pair of lift links 40 pivotally attached to the tractor by a suitable pivot pin 42 in a conventional manner. Intermediate the ends of the lift links 40, a connecting link 42 interconnects the lift link 40 and the outer end of each of the lift arms 22 in a conventional manner. This enables the lift links 40 to be swung in a vertical plane upon actuation of the lift arms 22.

Attached to the frame 28 at the center front thereof is a pair of laterally spaced and aligned brackets 44 that are rigidly fixed to the frame 28 in any suitable manner. Each bracket 44 has a slot 46 extending horizontally therein adjacent the bottom edge and the rear ends of the lift links 40 are connected to the brackets 44 by a transverse bar 48 which extends between these brackets and extends through the lift links 40 for slidably and pivotally connecting the lift links to the brackets 44. The bar 48 floats in the slot 46 and no draft force is applied by the tractor at this point since this is only for lifting and transporting of the implement. The bar 48 may have conventional structure such as the pins which normally connect the lift links 40 to the towed implement in which such pins may include an articulate or pivotal connection.

Extending upwardly from and connected to the bracket 44 is an A-frame assembly 50 having a pair of upwardly extending members 52 pivotally attached to the brackets 44 by pivot bolts 54 extending through one of several holes 56 in the bracket 44. The upper end of the members 50 are disposed adjacent to each other and receive therebetween the loop or eye member 58 on the upper end of a conventional top link 60 which has a central internally threaded tube 62 having a transversely extending handle 64 thereon for rotation thereof. The loop 58 is integral with an externally threaded shank 66 and a similar externally threaded shank 68 having a loop or eye thereon is provided at the other end of the central tube 62 whereby rotation of the tube 62 will cause extension and retraction of the top link 60. The loop or eye 58 is attached to the upper ends of the upstanding members 52 by a removable pivot bolt or pin 70 received in one of the group of vertically disposed apertures 72.

Extending rearwardly from the A-frame 50 is an elongated connecting link 74 pivotally attached between the upstanding members 52 by a pivot bolt or pin 76 orientated slightly below the pivot bolt or pin 70. The connecting link 74 is generally parallel with the frame 28 and disposed in vertically elevated position thereabove. The rear ends of the connecting link 74 is provided with a plurality of longitudinally spaced apertures 78 therein for receiving a fastening bolt or pin 80 that is disposed in one of a plurality of longitudinally spaced apertures 82 formed in an upstanding arm 84 that is rigid with an elongated transversely extending axle 86 which extends transversely of the frame and is journalled on the outer side members 34 by bearing brackets or journals 88. The arm 84 is rigidly affixed to the axle 86 in any suitable manner such as by welding or the like so that upon forward and rearward swinging movement of the arm 84, the axle 86 will be oscillated about its own longitudinal axis.

Rigidly affixed to each end of the axle 86 is an offset supporting assembly 90 in the form of a supporting arm 92 rigidly affixed to the axle 86 such as by welding or the like and the outer end of each arm 92 is provided with a yoke 94 pivotally attached to a vertically disposed channel bracket 96 by a pivot bolt or pin 98. The channel bracket 96 is attached to a vertically disposed spindle 100 which swivelly mounts a spindle 102 of a supporting caster wheel 104 whereby the wheeled yoke 106 may pivot about the vertical axis of the sleeve 100 when the spindle 102 rotates therein and the yoke 106 is inclined slightly rearwardly so that the wheel 104 may properly caster and trail the point of attachment of the spindle 102. As illustrated, the support arm 92 is attached to the channel-shaped bracket 96 adjacent the upper end thereof and a lower control link assembly generally designated by numeral 108 interconnects the lower end of the channel bracket 96 and a depending bracket 110 carried by the supporting frame 28 by virtue of a laterally extending bracket member 112 attached to the side frame rails 34 in any suitable manner. The link assembly 108 includes a pair of parallel angle iron members 114 pivotally attached to the lower end of the channel-shaped bracket 96 by a removable bolt or pin 116 and pivotally attached to the depending bracket 110 by similar removable bolts or pins 118. The plates 114 are parallel with the support arm 92 and cooperate therewith to form a pivotal parallelogram linkage for supporting the caster wheel 104 so that the swivel axis of the caster wheel will remain vertical during elevational changes of the caster wheel 104 due to the oscillation of the axle 86. Thus, as the A-frame 50 is pivoted forwardly, the connecting link 74 will cause corresponding forward pivotal movement of the arm 84 thus causing the axle 86 to oscillate about its own longitudinal axis for raising and lowering the caster wheel 104 in an obvious manner.

Attached centrally of the rear frame member 32 is an upstanding bracket 120 rigid therewith and upstanding from one of the central frame members 36 is a bracket 122 in parallel relation to the bracket 120 and the brackets 120 and 122 are on opposite sides of the axle 86 and generally in alignment with the arm 84. A flexible chain 124 connects the upper end of the bracket 120 with the arm 84 and a similar flexible chain 126 interconnects the bracket 122 and the arm 84 at the forward edge thereof as illustrated in FIGURES 1 and 3. This structure limits the pivotal movement of the axle 86 about its longitudinal axis with the two limits being illustrated in FIGURES 1 and 3 respectively and, of course, the degree of movement permitted the arm 84 and axle 86 is determined by the chains 124 and 126. The chains may be attached in any suitable manner and may be adjustably attached to the brackets 120 and 122 in any suitable manner if desired.

Thus, with this portion of the structure, the operation of the lift arms 22 will effect swinging movement of the lift links 40 in a conventional manner and inasmuch as the A-frame 50 is pivotally attached to the bracket 44, the initial thrust or lifting force exerted on the implement will cause the A-frame to pivot forwardly thus pulling the connecting link 74 forwardly and thereby lowering the wheels 104. This will lift or support a portion of the weight of the implement thereby enabling the tractor to, in effect, carry a heavier implement than it would normally be able to carry on a conventional three-point hitch without causing the front end of the tractor to fly up off the ground or otherwise damage the lift link system or hydraulic system. Thus, the front end of the tractor may remain on the ground when transporting the implement thereby eliminating the necessity of adding weights to the front end of the tractor to hold it down and accordingly renders the hitch assembly of the present invention advantageous since transport of relatively heavy implements may be accomplished by incorporating the present invention herein. By varying the points of attachment of the A-frame and the points of attachment of the top links as well as the effective length of the top links and by varying the points of attachment between the connecting link 74 and the arm 84, the characteristics of movement of the transport system may be varied for each implement desired to be connected to the tractor. This enables the present invention to be incorporated with various types of implements regardless of their characteristics with the orientation of the auxiliary wheels, of course, being variable depending upon the type of implement and frame provided therefor. This assembly is clearly adapted for use with conventional three-point hook up assemblies with the point of attachment of the top link 60 to the tractor being variable or conventional with the point of attachment as illustrated in the present invention adapting the present invention for use with the mechanism which converts a portion of the pull imparted to the implement into downward thrust on the rear wheels 16 of the tractor 14 in a manner described hereinafter.

The portion of the hitch assembly for converting a portion of the pull on the implement 12 to downward force on the tractor wheel 16 is best illustrated in FIGURES 1 and 3 and includes a pair of downwardly extending brackets 130 rigidly attached to the frame 28 and the brackets 130 have forwardly extending brackets 132 rigidly affixed to the lower end thereof which may be in the form of channel members, angle irons or other suitable structural elements whereby the brackets 132 are rigid with the frame 28 but spaced below the frame 28 and below the longitudinal center line of the tractor insofar as vertical height is concerned as illustrated in FIGURE 1. As illustrated in FIGURE 1, the bracket members 132 are bolted to the brackets 130 by suitable bolts 134 but any other suitable means of attachment may be provided.

Attached to each of the brackets 132 is a reinforcing plate 136 welded thereto or otherwise secured thereto which forms a reinforcement for the web of the channel-shaped member 132. The reinforcement member 136 as well as the bracket 132 is provided with a plurality of longitudinally spaced holes 138 therein for adjustably receiving a draft link assembly 140 which includes a vertically disposed tow bar 142 and a lower thrust bar 144 rigidly affixed to the lower end of the tow bar 142 by welding or the like. These two elements, in effect, form a bell crank with the apex thereof being removably and pivotally attached to the bracket 132 by virtue of a bolt or pin 146 extending through one of the apertures 138. The upper end of the tow bar 142 is interconnected by a transverse strap or bar 148 having offset ends 150 which are connected pivotally between the upper ends of the tow bar 142 by removable bolts or pins 152. The lower ends of the tow bars are also rigidly interconnected by a transverse bar 154 which serves to rigidify the draft link assembly 140.

Extending forwardly from the center of the transverse bar 148 and welded to the underside thereof is a pair of draft link elements 156 which are in parallel relation to each other and which are welded to the underside of the bar 148. The forward end of the draft links 156 have a plurality of longitudinally spaced apertures 158 therein which receives a transverse mounting bolt or pin 160 having a suitable bushing or the like thereon at which point the force of the tractor pulling forwardly is applied.

The thrust bar 144 parallels the draft links 156 and is also provided with a plurality of longitudinally spaced apertures 162 therein to which one end of a flexible chain 164 is attached by a suitable yoke or adapter 166. The other end of the chain 164 is provided with an adapter pin or fastener 168 attached to an upstanding bracket 170 rigid with one of the draft links 156. As illustrated in FIGURE 2, the thrust bar 144 is spaced inwardly from the tow bars 142 and is centrally mounted on the plate member 154 which, in effect, renders the thrust bar 144 rigid with the tow bar and pivotal in relation to the links 156 since the links 156 are rigid with the bar 148 which is pivotally attached to the upper ends of the tow bar 142.

Connected with the tractor is a generally vertically disposed pivoting pull bar 172 having a rearwardly extending upper end portion 174 connected with the conventional tractor hydraulic automatic depth control valve operating member 176 which may be orientated in the position where the top link of a standard three-point hitch is mounted. Disposed on the pull bar 172 is a bracket 178 to which the lower end of the top link 60 is adjustably attached by virtue of a plurality of apertures 180 receiving a removable pin or bolt 182. Below the bracket 178, the pivoting pull member is pivotally connected to a rearwardly extending bracket 184 by virtue of a removable pivot bolt or pin 186 received in one of a pair of vertically spaced apertures 188. The brackets 184 are rigidly affixed to the axle housing or differential housing 20 by vertical rods or pins 190 secured thereto in any suitable manner. Thus, exertion of force on the pivoting pull bar 172 will effect pivoting movement thereof about the pivot point defined by the removable bolt or pin 186.

At the lower end of the pivoting pull bar 172 which extends below the links 40, there is provided a pair of vertically spaced and generally parallel plates 192 which receive therebetween the transverse fastening bolt with a bushing thereon and this serves as a hitch clevis so that the bolt 160 may be retained between the plates 192 by virtue of a removable pin 194 having an eye on the upper end thereof with the pin being inserted through aligned apertures in the plates 192. The upper plate 192 is slightly shorter than the lower plate 192 to facilitate the connection of the draft link assembly 140 to the pivoting pull bar 172. This is actually the draft connection between the tractor and the implement in that the draft force transmitted from the tractor is transmitted to the bracket 184 and thence to the pivoting pull member 172 and through the pin or bolt 160 to the draft links 156, the tow bar 142, the brackets 132 and 130 and then to the implement frame.

The plates 192 may move through and between the draft links 156 thus enabling the draft link assembly 140 to pivot to the position illustrated in FIGURE 3 when the implement is being transported. However, the normal operating position of the draft link assembly 140 is illustrated in FIGURE 1.

In considering the orientation of the structure illustrated in FIGURE 1 which is the normal towing position, all draft forces are transmitted through the pivot point formed by the bolt 186. The links 40 which are lift links are in an intermediate position in the slot 46 and do not transmit any draft force. Thus, as a forward pull is exerted on the pin 160 by virtue of the tractor moving ahead and the removable pin 194 being behind the transverse pin 160, there will be a force exerted in an effort to move the bottom end of the pull bar 172 rearwardly thus resulting in a corresponding forward force being exerted on the hydraulic depth control valve operator 176 which force helps to keep the front of the tractor from coming up under loads thus giving better steering control because of the added weight on the front wheels and also serves to operate the automatic depth control valve operating member 176. Also, the resistance force of the implement causes a resulting downward force being exerted about the pivot point formed by the removable bolt or pin 146 inasmuch as the draft link 156 pull the pivot points or bolts 152 forwardly so that the thrust bar 144 then transmits a downward thrust to the draft links 156 through the chain 164 thus exerting a downward force on the pull bar for increasing the effective weight on the tractor tire and wheel assemblies.

Thus, when the tractor applies force at the hitch pin, the tow bar tries to pivot forward at the upper end thereof about pivot pin 146. This force causes the thrust bar 144 which is welded, in effect, to the tow bar to be pulled down also. The chain keeps the implement draft links and the thrust bar from pulling apart thus causing a resultant downward force to be applied to the bottom of the pivoting pull bar 172. This applies a downward force on the tractor wheels from the start instead of waiting for the implement to reach the predetermined setting of the conventional hydraulic depth control valve such as is employed in conventional three-point hitch systems. The draft link assembly 140 is constructed so that it will pivot to a collapsed position such as illustrated in FIGURE 3 to enable the implement to be easily transported when elevated such as is illustrated in FIGURE 3. Conventionally, the top link is connected to the automatic hydraulic control valve for operating the same upon a forward thrust being exerted thereon which only occurs when the implement tries to roll forward or roll over due to the tendency of the work engaging element to remain stationary while the frame moves forwardly. In the conventional set up, no depth control was effected until such time as the roll over commenced. In this invention, the depth control immediately begins as soon as drafting force is applied to the hitch pin 194.

When the hydraulic lifting mechanism is actuated, vertical force is exerted on the lifting links 40 by the lift arms 22 and connecting links 42. When the tractor starts lifting the implement from its working position, the A-frame 50 has its bottom end moved upwardly and due to the orientation of the top link 60, tension will be exerted thereon thereby urging the A-frame forwardly. As a result of the top link 60 being lifted upwardly and the fact that it is anchored to the pull bar 172, actually serves to cause a lifting force to be exerted on the pull bar 172 which due to its attachment to the tractor will exert a lifting force on the rear of the tractor thus helping to hold the front wheels down on the ground instead of lifting them off the ground as in the case with conventional three-point hitch systems. As a result of the A-frame 50 being drawn forwardly, the tension link 74 is pulled forward thus lifting the implement through the axle 86, lever 84 and offset arms at the end of the axle 86. Thus, the lifting of the implemnet is effected by the auxiliary wheels thus serving to support a part of the weight of the auxiliary implement and at the same time imparting downward force to the front of the tractor. There are two forces holding the weight of the implement in the raised position. They are: force A which is carried by the tractor lift arms and force B which is carried by the implement wheels. Force A exerts a downward force on the rear of the tractor removing weight from the tractor front wheels. Force B, which is the weight carried by the implement rear wheels exerts the forces C through linkages 92, 84 and 74. This force in turn is carried by the top link 60 which exerts the upward force D on the rear of the tractor. Force D counteracts force A, which is the downward force carried by the lift arms, and the result is that very little weight is removed from the tractor front wheels. On the standard 3-point hitch system, all the weight of the implement is carried by the tractor lift arms as shown by force A which exerts a downward force on the rear of the tractor and lacking the upward force D on the rear of the tractor, all of the weight of the implement is working to remove weight from the tractor front wheels in a standard 3-point hitch assembly. The percentage of the weight of the implement that is relieved from the tractor by the auxiliary wheels is determined by the location of the axle positioned on the implement. Further, by varying the points of attachment of the various components such as the link 74 and the arm 84, the initial and final position of the auxiliary wheels may be varied thus adapting the device for use with various implements. Also, the other various adjustable connections between the various components enables the device to be employed with various types of tractors and various types of implements having different movement requirement to effectively control the implement.

With the present invention installed on a tractor, a portion of the axle pull or draft exerted by the tractor is converted into a downward force on the tractor without sacrificing the effectiveness of the conventional tractor weight building hydraulic systems. The draft converted weight gained through the hitch of the present invention is in addition to what the conventional hydraulic weight building system produces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hitch assembly for connecting an implement to a towing tractor of the type having a pair of lift links movable in a vertical plane by hydraulically powered lift arms, said assembly comprising an upstanding A-frame assembly adapted to be connected to the implement adjacent the forward end thereof for oscillation about a transverse axis, axle means extending transversely and adapted to be mounted adjacent the rear of the implement, an offset arm on the axle means, link means pivotally interconnecting the upper end of the A-frame assembly and offset arm, auxiliary wheels supported from said axle means in offset relation whereby oscillation of the A-frame assembly will cause elevational changes in the auxiliary wheels for raising and lowering the implement from the ground surface, a top link member connected to the upper end portion of the A-frame assembly and extending to and adapted to be connected to the tractor at a point spaced from the lift links rearwardly of the lift arms, said lift links adapted to be connected with the implement for elevating the forward end thereof whereby the top link will be tensioned and cause the A-frame assembly to pivot forwardly for swinging the auxiliary wheels downwardly to elevate the rear portion of the implement for enabling the implement to be transported with only a portion of the weight thereof supported by the tractor, said tensioned top link exerting an upward force on the tractor rearwardly of the lift arms for counteracting a portion of the downward force exerted on the tractor by the lift arms, a pull bar vertically disposed and adapted to be pivotally connected intermediate its ends to the tractor for pivotal movement in a vertical plane, the upper end of the pull bar being connected with a hydraulic depth control valve on the tractor, the lower end of said pull bar having a hitch pin thereon, a draft link assembly detachably connected to the hitch pin and adapted to be connected to the implement frame for imparting draft forces to the frame.

2. The structure as defined in claim 1 wherein said lift links are attached to brackets adapted to be rigidly affixed to the implement by a pin and slot connection thereby enabling relative movement bbetween the lift links and the brackets thereby eliminating transmission of draft forces through the lift links.

3. The structure as defined in claim 1 wherein said top link is adapted to be connected with the tractor in normally downwardly inclined relation whereby upward movement of the implement will cause tension in the top link and pivotal movement toward a vertical position for pulling upwardly on the rear of the tractor.

4. A hitch assembly for connecting an implement to a towing tractor of the type having a pair of lift links movable in a vertical plane by hydraulically powered lift arms, said assembly comprising an upstanding A-frame assembly adapted to be connected to the implement adjacent the forward end thereof, axle means extending transversely and adapted to be mounted adjacent the rear of the implement, an offset arm on the axle means, link means pivotally interconnecting the upper end of the A-frame assemby and offset arm, auxiliary wheels supported from said axle means in offset relation whereby oscillation of the A-frame assembly will cause elevational changes in the auxiliary wheels for raising and lowering the implement from the ground surface, a top link member connected to the upper end portion of the A-frame assembly and extending to and adapted to be connected to the tractor at a point spaced from the lift links, said lift links adapted to be connected with the implement for elevating the forward end thereof whereby the top link will then cause the A-frame assembly to pivot forwardly for swinging the auxiliary wheels downwardly to elevate the rear portion of the implement for enabling the implement to be transported with only a portion of the weight thereof supported by the tractor, a pull bar vertically disposed and adapted to be pivotally connected intermediate its ends to the tractor for pivotal movement in a vertical plane, the upper end of the pull bar being connected with a hydraulic depth control valve on the tractor, the lower end of said pull bar having a hitch pin thereon, a draft link assembly detachably connected to the hitch pin and adapted to be connected to the implement frame for imparting draft forces to the frame, said draft link assembly including a downwardly offset bracket adapted to be rigidly affixed to the implement frame for lowering the application of force to the frame, an upwardly extending tow bar having the lower end pivotally attached to the bracket, a forwardly extending draft link connected pivotally with the upper end of the tow bar and engageable with the hitch pin, a forwardly extending thrust bar rigid with the lower end of the tow bar whereby the thrust bar and tow bar effectively form a bell crank assembly, a flexible chain interconnecting the forward end of the thrust bar with the draft link whereby application of draft force on the draft link will tend to align the draft link with the tow bar, such alignment being resisted by the chain interconnecting the thrust bar and draft link thereby exerting a downward pressure on the draft link and the hitch pin assembly on the pull bar thereby exerting downward force on the pull bar for converting a portion of the draft force into weight on the rear traction wheels of the tractor.

5. The structure as defined in claim 4 wherein said top link is connected to said pull bar above the point of connection with the tractor, said draft link assembly being collapsible to inoperative position when the implement is lifted by exerting upward force on the lift links of the tractor.

6. A hitch assembly for connecting an implement to a tractor of the type having an automatic depth control valve, said assembly comprising a pull bar vertically disposed and adapted to be pivotally connected intermediate its ends to the tractor for pivotal movement in a vertical plane, the upper end of the pull bar being connected with the hydraulic depth control valve on the tractor, the lower end of said pull bar having a hitch pin thereon, a draft link assembly detachably connected to the hitch pin and adapted to be connected to the implement frame for imparting draft forces to the frame, said draft link assembly including a downwardly offset bracket adapted to be rigidly affixed to the implement frame for lowering the application of force to the frame, an upwardly extending tow bar having the lower end pivotally attached to the bracket, a forwardly extending draft link connected pivotally with the upper end of the tow bar and engageable with the hitch pin, a forwardly extending thrust bar rigid with the lower end of the tow bar whereby the thrust bar and tow bar effectively form a bell crank assembly, a flexible chain interconnecting the forward end of the thrust bar with the draft link whereby application of draft force on the draft link will tend to align the draft link with the tow bar, such as alignment being resisted by the chain interconnecting the thrust bar and draft link thereby exerting a downward pressure on the draft link and the hitch pin assembly on the pull bar thereby exerting downward force on the pull bar for converting a portion of the draft force into weight on the rear traction wheels of the tractor.

7. A hitch assembly for connecting an implement to a towing tractor of the type having a pair of hydraulically powered lift arms operatively connected to a pair of lift links for moving the lift links in a vertical plane, said hitch assembly comprising an upstanding member adapted to be connected to the implement adjacent the forward end thereof for pivotal movement about a transverse horizontal axis, wheel means adapted to be vertically movably supported adjacent the rear of the implement, means interconnecting the upper end of the upstanding member with the wheel means to raise and lower the wheel means in response to fore and aft oscillation of the upstanding member, a tension member connected with the upper end portion of the upstanding member and extending downwardly and forwardly therefrom and adapted to be connected to the tractor at a point spaced from the lift links rearwardly of the lift arms whereby upward movement of the implement frame due to raising of the lift links will tension said tension member, said lift links adapted to be connected with the implement for elevating the forward end thereof for tensioning said tension member and urging the upstanding member forwardly for lowering the wheel means with the tensioned member exerting an upward force on the tractor rearwardly of the point of connection of the lift arms therewith for counteracting a portion of the downward force exerted on the tractor by the lift arms, a draft mechanism interconnecting the tractor and implement including a vertically disposed pull bar adapted to be pivotally connected intermediate its ends to the tractor for pivotal movement in a vertical plane, coupling the upper end of the pull bar adapted to be connected to a hydraulic depth control valve on the tractor, the lower end of said pull bar including a draft pulling assembly connected thereto and adapted to be connected to the implement frame for imparting draft forces to the frame.

References Cited by the Examiner

UNITED STATES PATENTS

| 2,312,258 | 2/43 | Martin | 172—239 |
| 2,414,114 | 1/47 | Martin | 172—10 |
| 2,673,505 | 3/54 | Altgelt | 172—445 X |
| 2,844,083 | 7/58 | Dushane | 172—239 |
| 2,973,817 | 3/61 | Monthei et al. | 172—239 |
| 3,062,561 | 11/62 | Wulff et al. | 280—405 |

FOREIGN PATENTS 1,254,509  1/61  France.

OTHER REFERENCES

Smirthwaite (German application), 1,116,461, publish date Nov. 2, 1961, 172—7.

ABRAHAM G. STONE, *Primary Examiner.*